United States Patent

Fredriksson

[11] Patent Number: 5,884,950
[45] Date of Patent: Mar. 23, 1999

[54] COUPLING DEVICE

[75] Inventor: Lars Fredriksson, Akersberga, Sweden

[73] Assignee: Frenolink Förvaltnings AB, Sweden

[21] Appl. No.: 771,232

[22] Filed: Dec. 20, 1996

[30] Foreign Application Priority Data

Dec. 22, 1995 [SE] Sweden .................................. 9504634

[51] Int. Cl.$^6$ ..................................................... B66C 1/14
[52] U.S. Cl. ..................................... 294/82.11; 294/82.19; 294/82.23
[58] Field of Search ............................. 294/74, 75, 82.1, 294/82.11, 82.12, 82.14, 82.17, 82.19–82.23; 24/68 CT, 116 R, 598.3, 598.4, 598.7, 599.1, 600.4, 600.5; 59/85, 86, 93

[56] References Cited

U.S. PATENT DOCUMENTS

| | | | |
|---|---|---|---|
| 1,310,548 | 7/1919 | Sandstrom | ........................ 24/599.1 X |
| 1,605,853 | 11/1926 | O'Bannon | ........................... 294/82.17 |
| 3,027,615 | 4/1962 | Forney | ................................ 24/116 R |
| 3,911,671 | 10/1975 | Guillen | .................................... 59/93 X |
| 4,530,534 | 7/1985 | Fredriksson . | |
| 4,977,649 | 12/1990 | Smetz | .............................. 294/82.11 X |
| 5,005,266 | 4/1991 | Fister et al. | .......................... 294/82.2 X |
| 5,177,837 | 1/1993 | Rekuc | ................................. 24/599.1 X |

FOREIGN PATENT DOCUMENTS

| | | | |
|---|---|---|---|
| 3119859 | 12/1982 | Germany . | |
| 3141090 | 5/1983 | Germany . | |
| 3828523 | 7/1990 | Germany | ............................ 294/82.11 |
| 2038991 | 7/1980 | United Kingdom . | |

Primary Examiner—Johnny D. Cherry
Attorney, Agent, or Firm—Quarles & Brady

[57] ABSTRACT

A coupling device for coupling a hoisting member, such as a hook (1), to a flexible hoisting strap (7). The device includes a coupling part (4) having a straight bar portion (6) with which the strap (7) engages. The device also includes a hoisting body part, such as a hook body (2) to be coupled to a hoisting device or a load. An entrance opening (10) is located opposite to the straight bar portion (6) and is dimensioned to snugly receive the narrowest dimension of the hoisting strap (7).

16 Claims, 5 Drawing Sheets

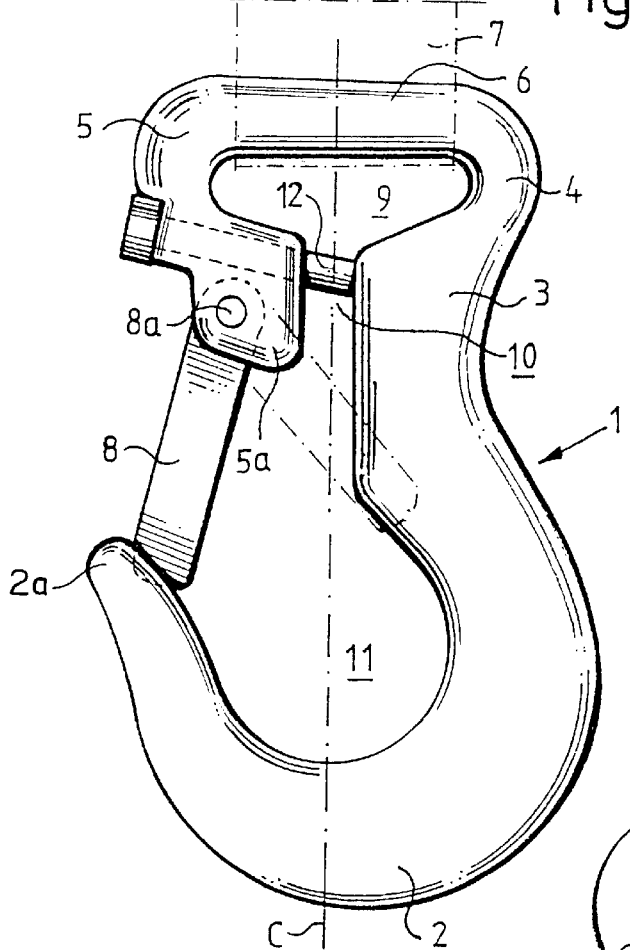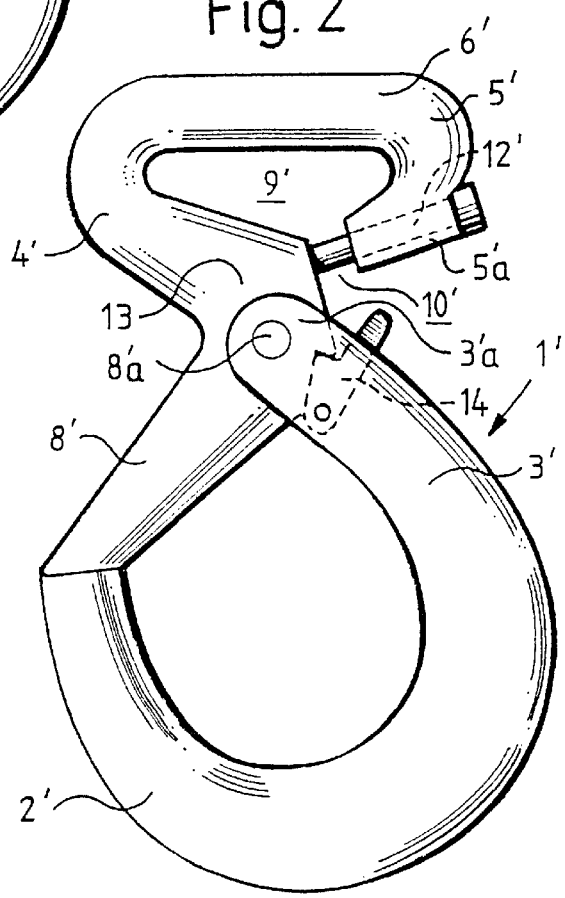

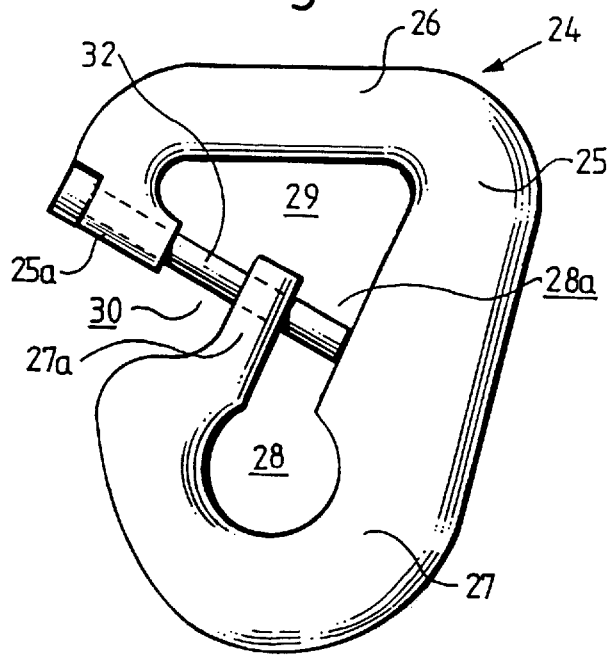
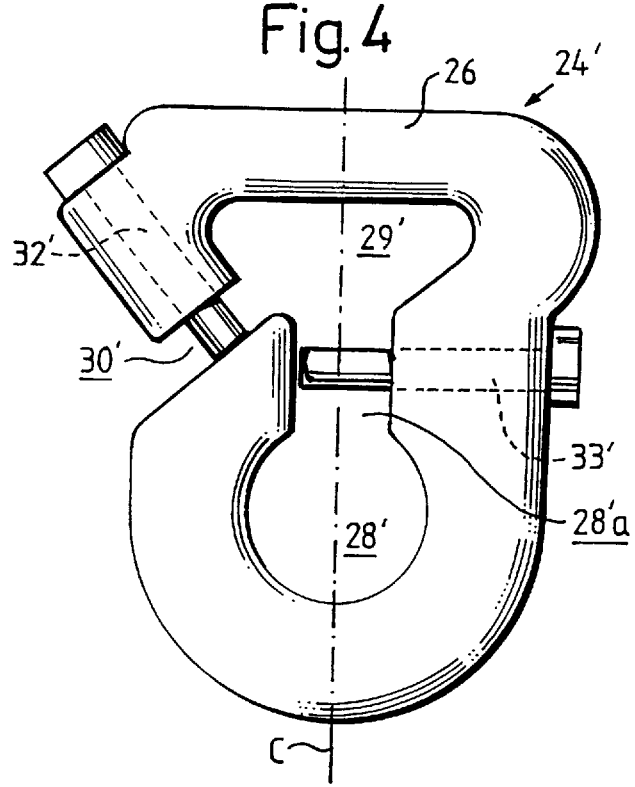

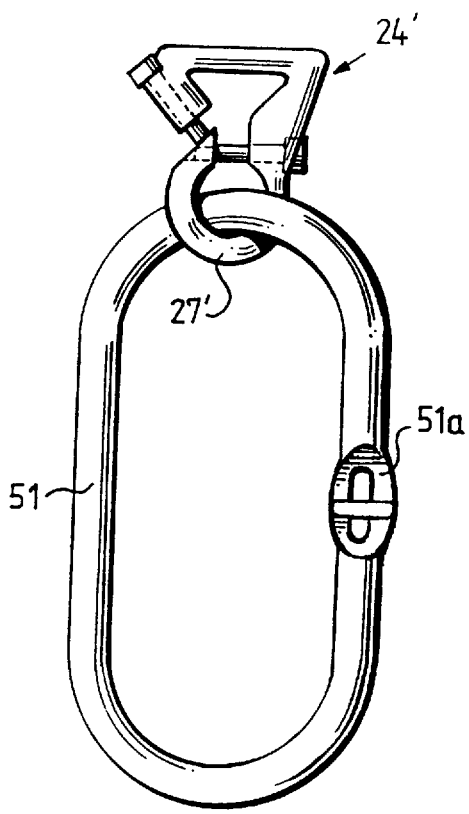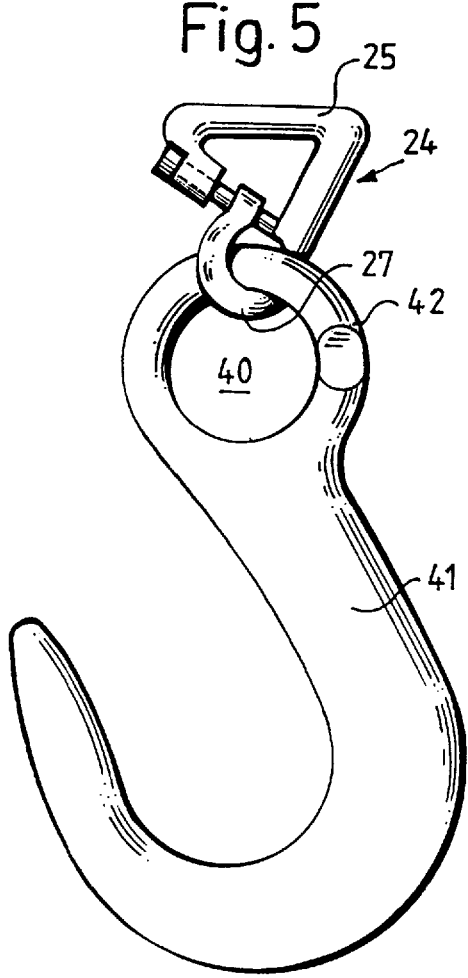

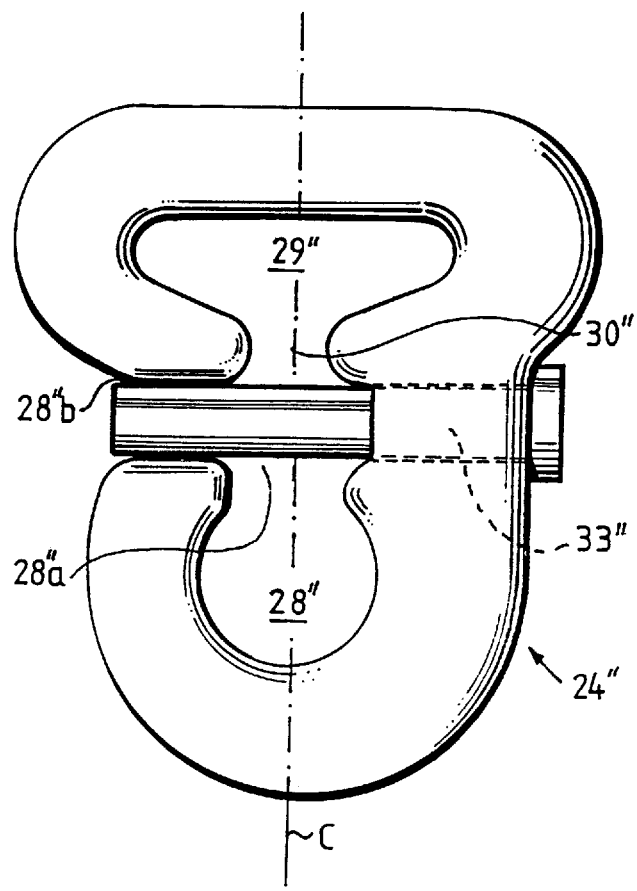

COUPLING DEVICE

FIELD OF THE INVENTION

The present invention relates to a device for coupling a hoisting member to a flexible hoisting strap, such as a flat textile strap or a hoisting sling of synthetic fibre material, said hoisting member comprising a coupling part to be coupled to said flexible hoisting strap and a hoisting body part, such as a hook or a closed link, to be coupled to a hoisting device or a load and defining a longitudinal load line, said coupling part including at least one suspension loop with a substantially straight bar portion extending transversely in relation to said load line, said suspension loop being dimensioned to receive and support said flexible strap and the latter engages, in a flat or flattened condition, with said straight bar portion while being loaded.

PRIOR ART

A well-known example of such a device is a safety hook having a shank provided with a swivel coupling part or a connecting schackle having a closed suspension loop. See e.g. GB-A-2038991.

When such a hook is to be coupled to a flexible hoisting strap, the latter has to be threaded through the closed suspension loop. Of course, this requires handling of an end portion of the hoisting strap in order to accomplish a secure coupling between the flexible hoisting strap and the safety hook.

SUMMARY OF THE INVENTION

The object of the present invention is to provide a coupling device which facilitates the coupling procedure, in particular with regard to the handling of the flexible hoisting strap.

According to the invention, this object is achieved in that the suspension loop has an entrance opening opposite to the substantially straight part portion and is dimensioned to snugly receive the narrowest dimension of said flexible hoisting strap, said entrance opening being accessible even during use of the device.

In this way, the hoisting strap can be inserted into the suspension loop of the coupling part without a threading operation.

Rather, the flexible hoisting strap can be introduced sideways into the suspension loop. In case the flexible hoisting strap has a closed configuration, the coupling operation is of course simplified to a high degree.

The coupling part can be integrally secured to the hoisting body part, e.g. in one piece. Alternatively, the coupling part may constitute a separate member, which is detachable from the hoisting body part.

The invention will now be described more fully with reference to the appended drawings.

BRIEF DESCRIPTION OF THE DRAWINGS

FIG. 1 is a side view of a first embodiment of a safety hook with an integrated coupling part according to the invention;

FIG. 2 is a side view of a second embodiment of a safety hook with an integrated coupling part according to the invention;

FIG. 3 is a side view of a separate coupling part according to the invention;

FIG. 4 is a side view of a modified version of the separate coupling part shown in FIG. 3;

FIG. 5 is a side view of the coupling part shown in FIG. 3, securely connected to a lifting hook;

FIG. 6 is a side view of the coupling part shown in FIG. 4 securely connected to an oval ring member; and FIG. 7 is a side view of still another separate coupling part according to the invention.

Figure 8:
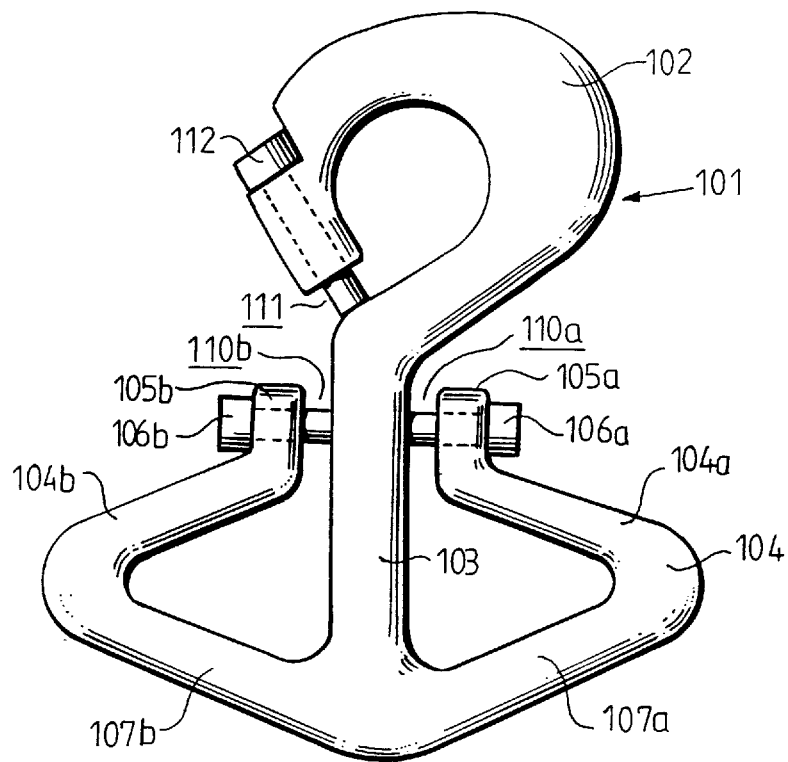
FIG. 8 is a side view of a hoisting member with a coupling part having two suspension loops to be coupled to flexible straps.

The safety hook 1 shown in FIG. 1 includes a conventional, arcuate hook body part 2, the shank 3 of which merges with a coupling part 4. The latter forms a suspension loop 5 with a straight bar portion 6 extending transversely, i.e. at right angle, to the longitudinal center line C of the safety hook 1, said center line defining the longitudinal load line when the safety hook 1 is coupled to a flat hoisting strap 7 indicated by dash-dotted lines in FIG. 1.

The suspension loop 5 has a free end 5a opposite to the tip 2a of the hook body 2. At the free end 5a of the suspension loop 5, a pivotable closure member 8 is journalled at a pivot axis 8a so as to permit pivoting between the fully drawn position closing the opening of the hook body (between the free end 5a and the tip 2a) and a retracted position indicated by dash-dotted lines and leaving the opening of the hook free.

According to the present invention, the interior opening 9 defined by the suspension loop 5 communicates with the outside of the hook via an entrance opening 10. In this particular embodiment, the entrance opening 10 is centrally located opposite to the straight bar portion 6 along the center line C so as to communicate with the interior space 11 of the hook body 2.

When coupling the flat hoisting strap to the hook 1, the strap is introduced sideways through the hook opening into the interior space 11, whereupon the closure member 8 is swung into the fully drawn closed position, and the strap 7 is thereafter inserted sideways through the entrance opening 10 into the suspension loop opening 9. In this process, a locking member in the form of a spring-biassed pin 12 is retracted, and the flat hoisting strap is turned from a vertical position into a horisontal position (as shown in FIG. 1), where it lies flat around the straight bar portion 6. The width of the entrance opening 10, which in this case has the form of a central slot between the shank 3 and the free end 5a of the suspension loop 5, is slightly larger than the thickness of the flat hoisting strap 7. Even in the absence of a locking pin 12, or in case the locking pin 12 has become stuck in retracted position, the hoisting strap 7 will remain within the suspension loop opening 9 during normal use and handling of the hook.

In the second embodiment of the safety hook 1' shown in FIG. 2, the closure member 8' is constituted by one arm of a lever 13, the other arm 4' of which constitutes the coupling part in the form of a suspension loop 5'. The latter includes a transversely extending straight bar portion 6' and a free end portion 5'a, which in this case is located at the back of the hook 1'. The free opening 9' defined by the suspension loop 5' communicates, via an entrance opening 10' defined by the central portion of the lever 13 and the free end 5'a of the suspension loop 5', with the outside of the hook at the back thereof adjacent to the shank 3'.

The lever 13 is journalled at a pivot axis 8'a provided at a fork-like end portion 3'a of the shank 3'. A spring-biassed latch member 14 engages with the lever 13 so as to hold the latter in closing position, as shown in FIG. 2.

In this embodiment, a flat lifting strap can be inserted via the entrance opening 10' into the suspension loop opening 9' (when the locking pin 12' is retracted) without interfering with the opening or the interior of the hook body 2'.

In the embodiment of the coupling device shown in FIGS. 3 and 5, there is a separate coupling part 24, the upper end portion of which forming a suspension loop 25 with a transverse straight bar portion 26, and the lower end portion of which including a hook-like portion 27. The latter defines a hook-like opening 28, which communicates with the interior opening of the suspension loop 25 at the upper end of the coupling part, the interior opening 29 communicating in turn with the outside via an entrance opening 30 between the free end 25a of the suspension loop and the free end 27a of the hook-like lower portion 27.

As appears from FIG. 5, the hook-like portion 27 is dimensioned to be securely connected to the eye 40 of a lifting hook 41. The closed, circular loop 42 defining the eye 40 has a flattened cross-section, which snugly fits into the entrance opening 30 and through the passage 28a between the suspension loop opening 29 and the hook-like opening 28 of the coupling part 24. Upon connecting the coupling part 24 to the eye 40 of the lifting hook 41, a flat lifting strap can easily be introduced into the interior opening via the entrance opening 30. In the shown embodiment, the interior opening 29 is so large that the lifting hook 41 can be detached from the coupling part 24 even when the flat flexible strap is positioned in engagement with the straight bar portion 26.

A relatively long locking pin 32 is adapted to close the entrance opening 30 as well as the passage 28a between the hook-like opening 28 and the suspension loop opening 29.

The embodiment of the coupling device shown in FIGS. 4 and 6 is similar to the one shown in FIGS. 3 and 5, although the hoisting body part is an oval ring member 51 instead of a lifting hook.

Also, the shape of the coupling part 24' is slightly different in that the passage 28'a between the hook-like opening 28' and the suspension loop opening 29' extends vertically along the center line C of the device, whereas the entrance opening 30' extends at an angle to the vertical center line C. Moreover, there are separate locking pins 32' and 33' for closing the entrance opening 30' and the passage 28'a, respectively.

As can be seen from FIG. 6, the oval ring member 51 has a flattened portion 51a adapted to be snugly received into the entrance opening 30' and the passage 28'a. The flattened portion 51a is located at the mid portion of one of the two longer sides of the oval ring member 51.

In the modified embodiment of the coupling part 24" shown in FIG. 7, the entrance opening 30" is located at the center line C of the device, between the suspension loop opening 29" and the hook-like opening 28", whereas a common insertion passage 28"b is located at the mid-portion of the coupling part 24" and is oriented at right angle to the center line C.

A locking pin 33" is adapted to be extended coaxially into the common passage 28"b so as to close the latter as well as the central passage 28"a between the suspension loop opening 29" and the hook-like opening 28".

The coupling part 24" of FIG. 7 can be connected to a lifting hook like the one in FIG. 5, an oval ring member like the one in FIG. 6 or some other hoisting body part.

Figure 9:
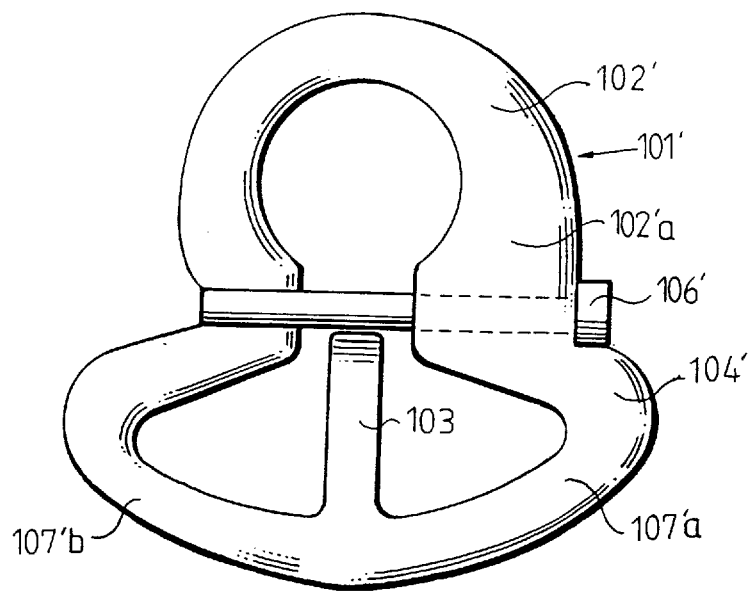
FIG. 9 is another embodiment of a hoisting member with two suspension loops.

In FIGS. 8 and 9, there are shown two hoisting members 101 and 101', respectively, having an upper hoisting body part 102, 102' to be connected to a hoisting device (not shown), such as a hoisting chain, a hoisting wire or a hoisting strap, possibly by the intermediary of a link with a flattened portion, and a lower coupling part 104, 104' to be connected to one or two flexible hoisting straps (not shown).

In the embodiment of FIG. 8, the upper hoisting body part 102 is formed like an eye with an entrance opening 111 which is normally closed by a spring-biassed pin 112 and which permits the insertion of a flattened portion of a coupling link (not shown but possibly similar to the link 51 shown in FIG. 6). The upper part 102 merges with a central, vertical rod portion 103, which carries two suspension loop portions 104a, 104b located symmetrically on each side thereof. Entrance openings 110a, 110b are defined between the central rod portion 103 and the respective free end portions 105a, 105b of the suspension loops 104a, 104b. Each such entrance opening 110a, 110b can be closed by a respective spring-biassed pin member 106a, 106b.

The straight bar portion 107a, 107b of each suspension loop extends transversely outwardly from the lower end of the central rod portion 103, slightly upwardly so as to form an acute angle with the central rod portion and face inwardly towards the respective entrance opening 110a, 110b.

Of course, a flat, flexible hoisting strap (not shown) can be inserted into each entrance opening 110a, 110b and be adjusted so as to be supported by the respective straight bar portion 107a, 107b and carry either a common load or two separate loads.

The modified embodiment illustrated in FIG. 9 has a strong portion 102'a (to the right) of the hoisting body part 102' which merges with the lower coupling part 104'. The latter is thus carried at one side thereof and defines a common insertion opening at the opposite side (to the left), the common insertion opening being closable by a long spring-biassed pin 106'. In use, this embodiment is similar to the previous one with two substantially straight bar portions 107'a, 107'b on each side of a central, vertical rod portion 103'.

Those skilled in the art will realize that the coupling part, the hoisting body part and the entrance opening for insertion of a flexible hosting strap may be modified further in many ways within the scope defined by the appended claims. Instead of a flat strap, a hoisting sling member may be used. Such a hoisting sling member may consist of a number of parallel hoisting cords, enclosed within a flexible sheath. Normally, such a sling member has a substantially circular cross-section, but in use, upon being loaded against the straight bar portion 25, the sling member is flattened into an elongated cross-section.

I claim:

1. A device for coupling a hoisting member to at least one flexible hoisting strap, said hoisting member comprising a strap coupling part to be coupled to said at least one flexible hoisting strap and a hook part to be coupled to a hoisting device or a load, and defining a longitudinal load line, said strap coupling part constituting a first end portion of said hosting member and said hook part constituting a second end portion of said hoisting member, along said longitudinal load line, said strap coupling part including at least one suspension loop with an interior opening and a substantially straight bar portion extending transversely in relation to said load line, said suspension loop being dimensioned to receive and support said flexible strap when the latter engages, in a flat or flattened condition, with said straight bar portion while being loaded, wherein said interior opening of said suspension loop has an entrance opening which is located at a mid portion of said hoisting member opposite to said substantially straight bar portion and which is dimensioned to snugly receive a narrow dimension of said flexible hoisting strap, said entrance opening being accessible even during use of the device upon retraction of a locking member, which normally closes said entrance opening, and wherein said hook part has a hook gap, located in said mid portion of said hoisting member, said hook gap being closable by a closure means.

2. A coupling device as defined in claim 1, wherein said strap coupling part and said hook part are directly secured to each other.

3. A coupling device as defined in claim 2, wherein said strap coupling part and said hook part are made in one piece.

4. A coupling device as defined in claim 1, wherein said hook part is a safety hook.

5. A coupling device as defined in claim 4, wherein a shank portion of the safety hook merges with said suspension loop, and wherein said closure means is pivotably journalled at said suspension loop.

6. A coupling device as defined in claim 5, wherein said entrance opening communicates with the hook gap inside said closure member.

7. The coupling device as defined in claim 4, wherein a lever is journalled at a shank of said hook part, a first arm of said lever forming said closure member and a second arm of said lever forming said suspension loop.

8. The coupling device as defined in claim 7, wherein said entrance opening is located adjacent to said shank of the hook part.

9. The coupling device as defined in claim 1, wherein said locking member is integral with said closure means.

10. The coupling device as defined in claim 1, wherein said hook part forms an upper part of said hoisting member, whereas said strap coupling part forms a lower part of said hoisting member.

11. The coupling device as defined in claim 10, wherein said strap coupling part comprises two suspension loops located symmetrically on each side of a central, substantially vertically extending portion of said strap coupling part.

12. The coupling device as defined in claim 11, wherein each of said suspension loops has an entrance opening located adjacent to said central portion of said strap coupling part.

13. The coupling device as defined in claim 11, wherein the substantially straight bar portion of each suspension loop extends obliquely upwards from the lower end of said central portion of said strap coupling part.

14. The coupling device as defined in claim 1, wherein said suspension loop of said strap coupling part merges with said hook part which is dimensioned to securely engage with a separate hoisting device.

15. The coupling device as defined in claim 14, wherein said separate hoisting device is a closed ring member having a flattened portion dimensioned to be snugly received into said hook part.

16. The coupling device as defined in claim 14, wherein said separate hook part is a lifting hook having an eye which is securely connectable to said hook part.

\* \* \* \* \*